US010856716B2

(12) United States Patent
Ham et al.

(10) Patent No.: US 10,856,716 B2
(45) Date of Patent: Dec. 8, 2020

(54) ROBOT CLEANER

(71) Applicant: LG ELECTRONICS INC., Seoul (KR)

(72) Inventors: Seaunglok Ham, Seoul (KR); Jaeheon Chung, Seoul (KR); Seungjin Lee, Seoul (KR); Hwang Kim, Seoul (KR); Hyeongshin Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 16/018,249

(22) Filed: Jun. 26, 2018

(65) Prior Publication Data

US 2018/0368645 A1 Dec. 27, 2018

(30) Foreign Application Priority Data

Jun. 26, 2017 (KR) ........................ 10-2017-0080690

(51) Int. Cl.
| | | |
|---|---|---|
| *A47L 11/40* | (2006.01) | |
| *A47L 9/00* | (2006.01) | |
| *G05D 1/02* | (2020.01) | |
| *A47L 5/22* | (2006.01) | |
| *A47L 9/28* | (2006.01) | |
| *A47L 9/14* | (2006.01) | |

(52) U.S. Cl.
CPC ........... *A47L 11/4061* (2013.01); *A47L 5/225* (2013.01); *A47L 9/009* (2013.01); *A47L 9/1463* (2013.01); *A47L 9/2805* (2013.01); *A47L 11/4011* (2013.01); *A47L 11/4013* (2013.01); *A47L 11/4063* (2013.01); *G05D 1/0231* (2013.01); *A47L 2201/04* (2013.01); *G05D 2201/0215* (2013.01)

(58) Field of Classification Search
CPC .............. A47L 11/4011; A47L 11/4013; A47L 11/4061; A47L 11/4063; A47L 2201/04; A47L 5/225; A47L 9/009; A47L 9/1463; A47L 9/2805; G05D 1/0231; G05D 2201/0215
See application file for complete search history.

(56) References Cited

U.S. PATENT DOCUMENTS

2007/0100501 A1* 5/2007 Im ........................... A47L 9/009
                                                            700/259
2014/0257563 A1* 9/2014 Park ..................... G05D 1/0248
                                                            700/259

FOREIGN PATENT DOCUMENTS

| CN | 204813717 U | * 12/2015 |
|---|---|---|
| EP | 2 792 287 | 10/2014 |

(Continued)

OTHER PUBLICATIONS

CN 204813717 U—English Machine Translation (Year: 2015).*

(Continued)

*Primary Examiner* — Marc Carlson
(74) *Attorney, Agent, or Firm* — KED & Associates, LLP

(57) ABSTRACT

The present disclosure discloses a robot cleaner, including a cleaner body; and a sensing unit disposed in the cleaner body, wherein the sensing unit includes a rotating body configured to be horizontally rotatable around a rotation shaft passing through an inside of the cleaner body; a sensing unit mounted on one side of the rotating body to sense a feature or an obstacle in the vicinity of the cleaner body; and a tilting unit installed inside the rotating body to vertically tilt the sensing unit.

17 Claims, 11 Drawing Sheets

(56) References Cited

FOREIGN PATENT DOCUMENTS

| | | | |
|---|---|---|---|
| JP | 2006-015048 | 1/2006 | |
| JP | 200615048 A * | 1/2006 | |
| JP | 2013-009107 | 1/2013 | |
| JP | 2013009107 A * | 1/2013 | |
| JP | 2013144024 A * | 7/2013 | ........... A47L 9/2884 |
| KR | 10-0738888 | 7/2007 | |
| KR | 10-0829094 | 5/2008 | |
| KR | 100829094 B1 * | 5/2008 | |
| KR | 10-1185136 | 9/2012 | |
| KR | 10-1222929 | 1/2013 | |
| KR | 10-2013-0024159 | 3/2013 | |
| KR | 20130024159 A * | 3/2013 | |
| KR | 10-1411685 | 7/2014 | |
| KR | 101411685 B1 * | 7/2014 | ............... A47L 9/00 |
| KR | 10-2014-0109172 | 9/2014 | |
| KR | 20140109172 A * | 9/2014 | ........... G05D 1/0248 |
| WO | WO-2013162094 A1 * | 10/2013 | |

OTHER PUBLICATIONS

Korean Notice of Allowance dated Apr. 19, 2019 issued in KR Application No. 10-2017-0080690.
Korean Office Action issued in Application 10-2017-0080690 dated Jun. 19, 2018.

* cited by examiner

ROBOT CLEANER

CROSS-REFERENCE TO RELATED APPLICATION(S)

Pursuant to 35 U.S.C. § 119(a), this application claims the benefit of earlier filing date and right of priority to Korean Application No. 10-2017-0080690, filed on Jun. 26, 2017, the contents of which is incorporated by reference herein in its entirety.

BACKGROUND

1. Field

The present disclosure relates to a robot cleaner configured with a sensing unit capable of panning (horizontally moving) and tilting (being disposed in a vertically inclined manner).

2. Background

In general, robots have been developed for industrial use and have been part of factory automation. In recent years, the field of applications of robots has been further expanded, and home robots that can be used in ordinary homes as well as aerospace robots and medical robots have been made.

A representative example of a home robot is a robot cleaner. The robot cleaner carries out a function of cleaning the floor while traveling a predetermined area by itself. For example, a home robot cleaner is configured to autonomously travel the inside of a house and suck dust (including foreign matter) on the floor or mop the floor.

Such a robot cleaner is generally provided with a rechargeable battery and various sensors capable of avoiding obstacles during traveling to autonomously travel the inside of the house and perform a cleaning function and perform additional functions such as photographing and monitoring the inside of the house. In order to perform the foregoing functions, it is most important for the robot cleaner to set the traveling route and sense a feature (including an obstacle) on the traveling route.

However, in general, a robot cleaner having a sensor fixedly disposed at the front of the cleaner body has difficulties in sensing left and right ends of the cleaning module and a feature in front, and sensing a feature in a direction desired to change while changing the traveling route due to a limited angle of view of the sensor.

Korean Patent No. 10-1185136 (registered on Sep. 17, 2012, see FIGS. 1A and 1B) discloses a stabilizer pan-tilt apparatus 20 that corrects a target point to be photographed by a video camera 21 due to the posture of a vehicle mobile platform. However, the foregoing prior art configuration is not suitable for a small household appliance such as a robot cleaner due to a structure suitable for a large mobile platform 10 such as an automobile, and there is a problem that since a posture stabilization controller 23 is installed between the mobile platform 10 and the pan-tile apparatus 22, an error is accumulated in the posture stabilization controller 23 when an impact occurs in the mobile platform 10. In addition, when the pan-tilt apparatus 20 is applied to the sensing unit of the robot cleaner, it is difficult to reduce an overall size of the robot cleaner.

Korean Patent No. 10-1222929 (registered on Jan. 10, 2013, see FIG. 1C) discloses a structure of a pan-tilt apparatus 30 for a photographing device in which a pan motor 31 and a tilt motor 31 are formed in a layered structure. However, when the pan-tilt apparatus 30 is provided in the robot cleaner, due to difficulty in entering a region having a low height such as under a couch or under a table as the height of the robot cleaner increases, there is a limit in applying the foregoing related art to a robot cleaner that should be configured as compact as possible.

The above references are incorporated by reference herein where appropriate for appropriate teachings of additional or alternative details, features and/or technical background.

BRIEF DESCRIPTION OF THE DRAWINGS

Examples and embodiments may be described in detail with reference to the following drawings in which like reference numerals refer to like elements and wherein.

DETAILED DESCRIPTION

Hereinafter, a robot cleaner associated with the present disclosure will be described in detail with reference to the accompanying drawings. A singular representation may include a plural representation as far as it represents a definitely different meaning from the context. In describing the embodiments disclosed herein, moreover, the detailed description will be omitted when a specific description for publicly known technologies to which the invention pertains is judged to obscure the gist of the present disclosure.

The accompanying drawings are used to help easily understand various technical features and it should be understood that the embodiments presented herein are not limited by the accompanying drawings, and the present disclosure should be construed to extend to any alterations, equivalents and substitutes in addition to those which are particularly set out in the accompanying drawings.

Figure 1A:
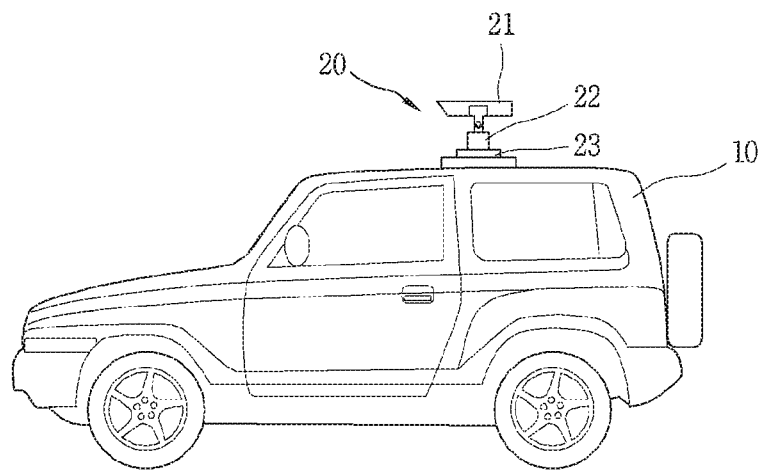
FIGS. 1A through 1C are views illustrating a pan-tilt apparatus disclosed in the prior art.
Figure 1B:
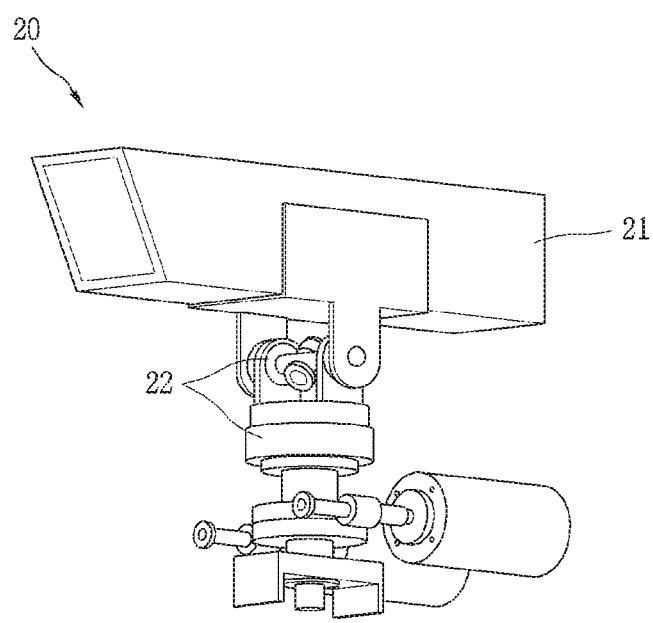
Figure 1C:
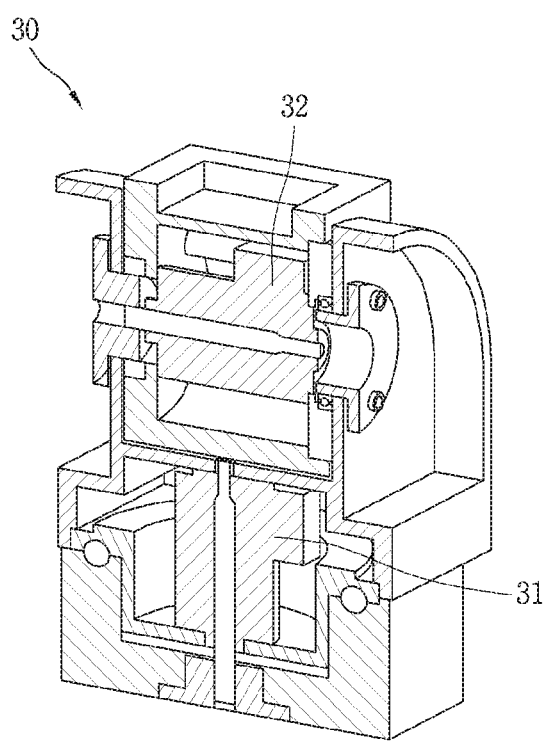
Figure 2A:
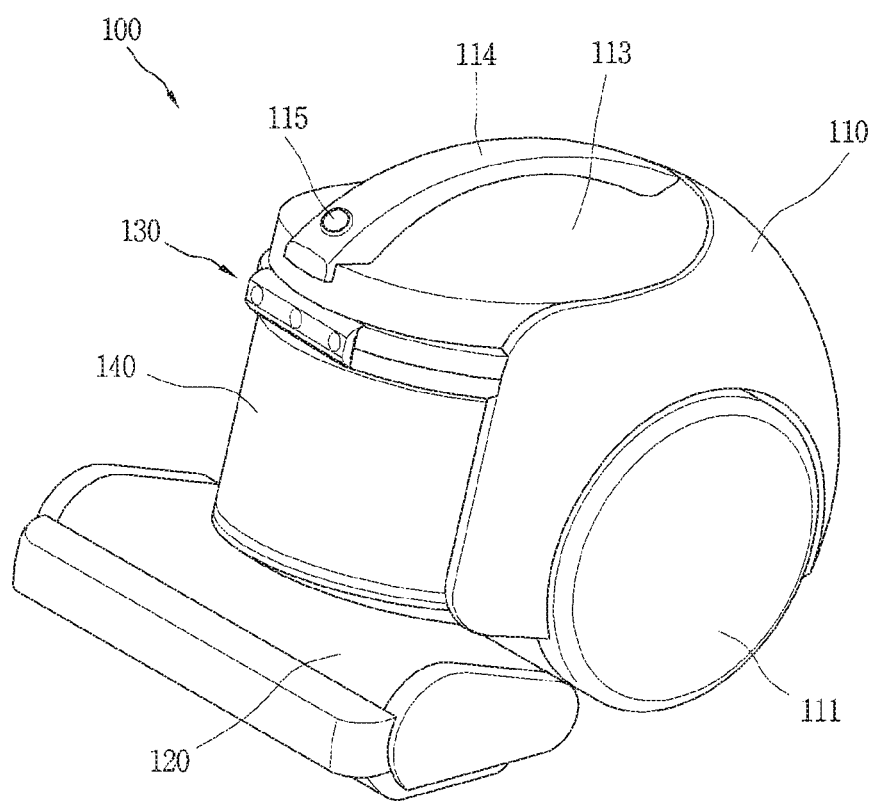
FIGS. 2A and 2B are perspective views illustrating an example of a robot cleaner according to the present disclosure.
Figure 2B:
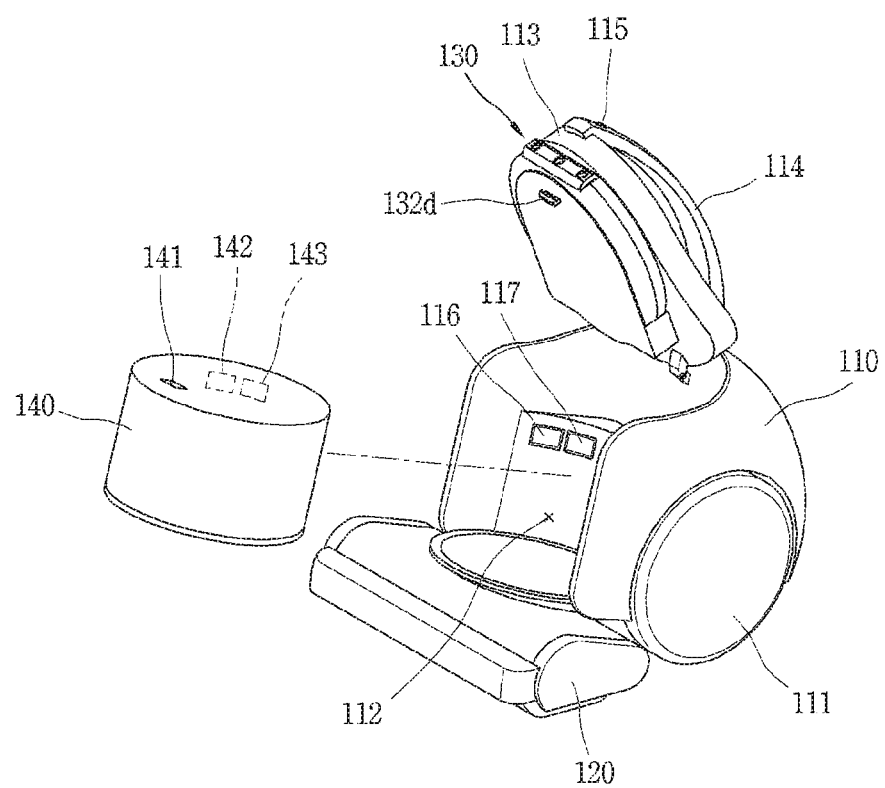

FIGS. 2A and 2B are perspective views illustrating an example of a robot cleaner 100 according to the present disclosure. Referring to FIGS. 2A and 2B, the robot cleaner (or autonomous cleaner) 100 performs a function of cleaning a floor while traveling on a predetermined area by itself. Cleaning of a floor mentioned here includes sucking dust or foreign matter on the floor or mopping the floor.

The robot cleaner 100 includes a cleaner body 110, a cleaning module (or cleaning head) 120, a sensing unit (or sensing module) 130, and a dust bin 140. Various components are integrated into or mounted on the cleaner body 110, including a controller (not shown) for the control of the robot cleaner 100.

The cleaner body 110 is provided with a dust bin accommodation portion (or dust bin accommodation recess) 112, and the dust bin 140 for separating dust from the air sucked to collect the dust is detachably coupled to the dust bin accommodation portion 112. As shown in the drawings, the dust bin accommodation portion 112 may be formed recessed from the front side to the rear side of the cleaner body 110 in a shape that is open in the forward and upward direction of the cleaner body 110. The dust bin accommodation portion 112 may, of course, be formed at another position (for example, behind the cleaner body 110) depending on the type of the robot cleaner.

A driving wheel 111 is provided in the cleaner body 110. The driving wheel 111 is configured to be rotatable by receiving a driving force from a motor (not shown). The rotation direction of the motor may be controlled by a controller (not shown), and accordingly, the driving wheel 111 may be configured to be rotatable in one direction or another direction.

The driving wheels 111 may be provided on both left and right sides of the cleaner body 110, respectively. The cleaner body 110 may move forward, backward, leftward and rightward by the driving wheels 111. Each of the driving wheels 111 may be configured to be drivable independently from each other. For this purpose, each driving wheel 111 may be driven by a different motor. As described above, the controller is configured to control the driving of the driving wheel 111 in such a manner that the robot cleaner 100 autonomously travels on the floor.

The cleaner body 110 may be provided with a photographing unit (or position sensor) 115 for simultaneous localization and mapping (SLAM) of the robot cleaner. An image photographed by the photographing unit 115 is used to generate a map of a traveling region or sense the current position in the traveling region.

An upper cover 113 is disposed on the cleaner body 110 to cover the dust bin 140 accommodated in the dust bin accommodation portion 112. In the drawings, the upper cover 113 is hingedly connected to one side of the cleaner body 110 to be rotatable. In addition, the upper cover 113 may be configured to be detachably separated from the cleaner body 110. The separation of the dust bin 140 with respect to the dust bin accommodation portion 112 may be restricted in a state that the upper cover 113 is disposed to cover the dust bin 140.

The sensing unit 130 may be disposed below the upper cover 113, and the sensing unit 130 may be detachably coupled to the dust bin 140. It will be described in detail later.

The upper cover 113 is provided with a handle 114. The handle 114 may be provided with the foregoing photographing unit 115. Here, the photographing unit 115 is preferably disposed to be inclined with respect to the bottom surface of the cleaner body 110 so that the photographing unit 115 can photograph the front side and the upper side together.

Meanwhile, a battery (not shown) for supplying power to the robot cleaner 100 is mounted on the cleaner body 110. The battery may be configured to be rechargeable, and configured to be detachable from the cleaner body 110.

The cleaning module 120 is configured to suck air containing dust or clean the floor. Here, the cleaning module 120 for sucking air containing dust may be referred to as a suction module, and the cleaning module 120 configured to clean the floor may be referred to as a mop module.

The cleaning module 120 may be detachably coupled to the cleaner body 110. When the suction module is separated from the cleaner body 110, the mop module may be detachably coupled to the cleaner body 110 in place of the separated suction module 120.

Accordingly, the suction module may be mounted on the cleaner body 110 when the user wants to remove dust on the floor, and the mop module may be mounted on the cleaner body 110 when the user wants to mop the floor. The cleaning module 120 may, of course, be configured to have a function of cleaning the floor after sucking air containing dust.

The cleaning module 120 may be disposed below the cleaner body 110 or may be disposed in a shape protruded from one side of the cleaner body 110 as shown in the drawing. The one side may be a side on which the cleaner body 110 travels in a forward direction, that is, a front side of the cleaner body 110.

In the present drawings, it is shown that the cleaning module 120 is protruded from one side of the cleaner body 110 to a front side and both left and right sides thereof. A front end portion of the cleaning module 120 is disposed at a position spaced forward from one side of the cleaner body 110 and both left and right end portions of the cleaning module 120 are disposed at positions spaced apart from one side of the cleaner body 110 to both left and right sides thereof.

The sensing unit 130 is disposed in the cleaner body 110 to sense surrounding features (including obstacles) to prevent the robot cleaner 100 from hitting obstacles. Moreover, the sensing unit 130 may be configured to allow panning (horizontally moving) and tilting (being disposed in a vertically inclined manner) to improve a sensing function of the robot cleaner and a driving function of the robot cleaner. It will be described in detail later. In the drawings, it is shown that the sensing unit 130 is disposed in front of the cleaner body 110 and disposed between the dust bin 140 and the upper cover 113.

The dust bin 140 is detachably coupled to the dust bin accommodation portion 112. As illustrated in the drawings, a portion of the dust bin 140 may be accommodated in the dust bin accommodation portion 112, and another portion of the dust bin 140 may be formed to protrude toward the front side of the cleaner body 110.

The dust bin 140 is formed with an inlet 142 through which air containing dust is introduced and an outlet 143 through which air separated from dust is discharged, and when the dust bin 140 is mounted on the dust bin accommodation portion 112, the inlet 142 and the outlet 143 are configured to communicate with a first opening 116 and a second opening 117 formed in an inner wall of the dust bin accommodation portion 113, respectively.

A suction flow path formed inside the cleaner body 110 corresponds to a flow path from the cleaning module 120 to the first opening 116 and a discharge flow path corresponds to a flow path from the second opening 117 to the discharge port. According to such a configuration, air containing dust introduced through the cleaning module 120 is introduced into the dust bin 140 through the suction flow path inside the cleaner body 110, and air and dust are separated from each other as they pass through at least one dust separation unit (for example, cyclone, filter, etc.) inside the dust bin 140. Dust is collected in the dust bin 140, and air is discharged from the dust bin 140 and then discharged to the outside through the discharge flow path inside the cleaner body 110 and finally through the discharge port.

On the other hand, it is important that the robot cleaner 100 senses features in the aspect that it travels autonomously to perform cleaning. However, in the case where the cleaning module 120 has a shape protruded from the cleaner body 110 as in the present embodiment, as far as no separate sensing unit is provided in the cleaning module 120, there is a problem that it is difficult to sense left and right ends of the cleaning module and a feature in front. Furthermore, when the sensor unit is fixedly disposed on the cleaner body 110, there is a problem in that it is impossible to sense in advance a feature on the travel route to be changed.

In order to solve this problem, the present disclosure proposes a sensing unit 130 configured to be capable of panning and tilting to extend a sensible region. Hereinafter, a basic configuration of the sensing unit 130 configured to be capable of panning and tilting will be described.

Figure 3:
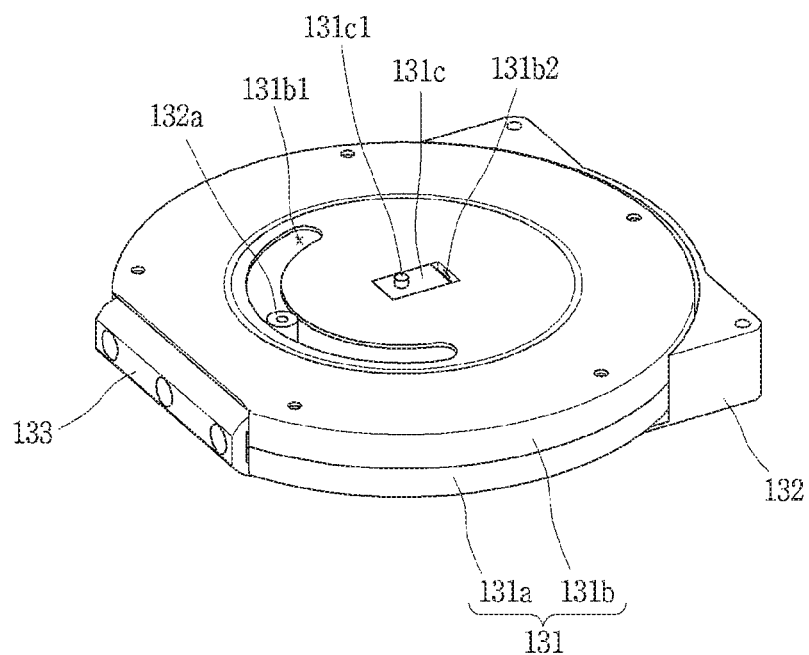
FIG. 3 is a view in which a sensing unit of the robot cleaner illustrated in FIG. 2A is separately illustrated.
Figure 4:
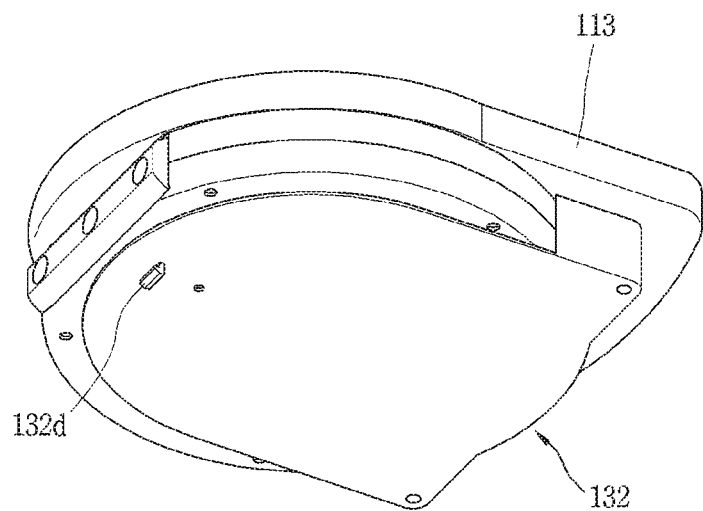
FIG. 4 is an exploded perspective view of the sensing unit illustrated in FIG. 3.
Figure 5:
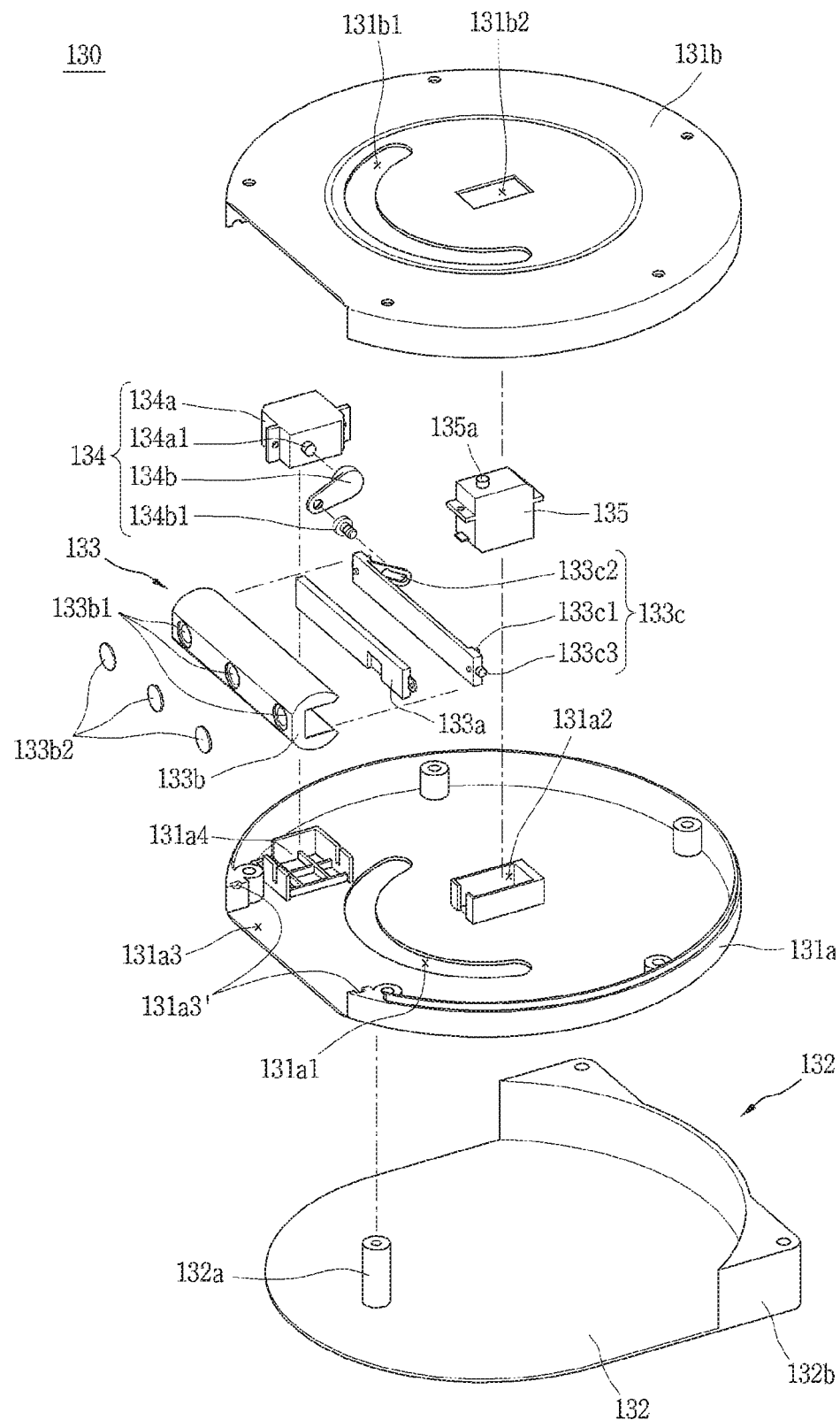
FIG. 5 is an internal assembly view of the sensing unit illustrated in FIG. 4.
Figure 6:
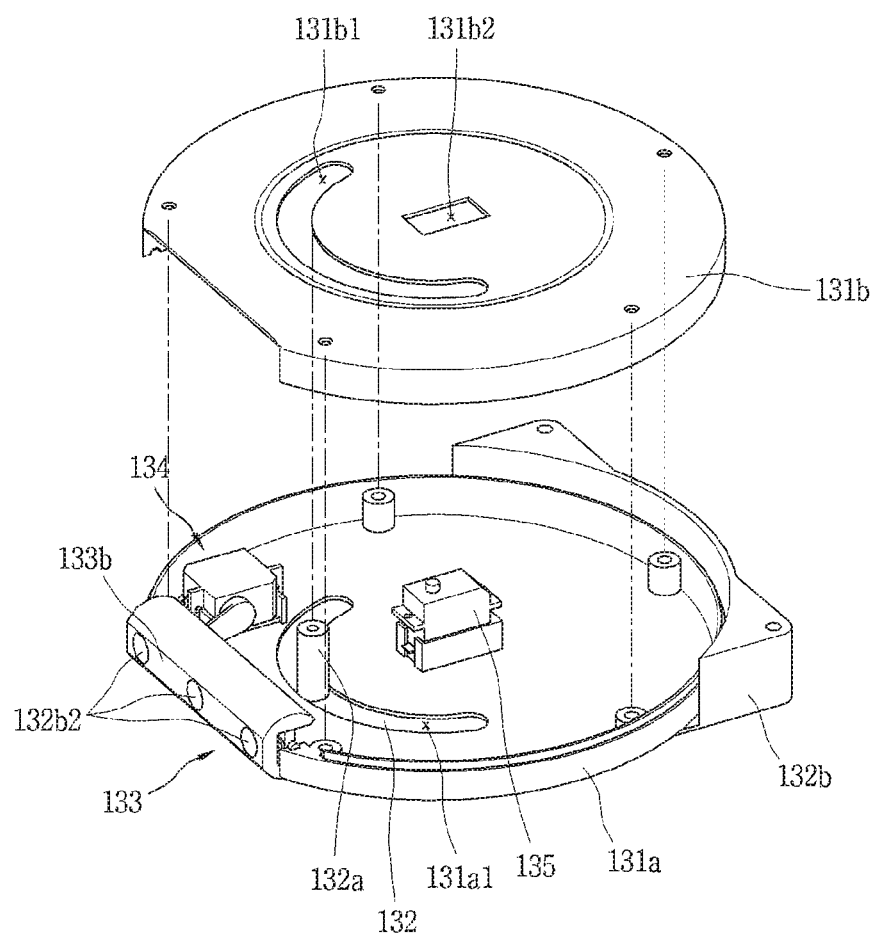
FIG. 6 is a view illustrating the bottom of the sensing unit illustrated in FIG. 3.

FIG. 3 is a view in which the sensing unit 130 of the robot cleaner illustrated in FIG. 2A is separately illustrated, and FIG. 4 is an exploded perspective view of the sensing unit 130 illustrated in FIG. 3, and FIG. 5 is an internal assembly view of the sensing unit 130 illustrated in FIG. 4. For reference, in FIG. 5, it is illustrated that a base frame 131a and a cover frame 131b are separated from each other to describe an internal appearance of the sensing unit 130. Moreover, FIG. 6 is a view illustrating the bottom of the sensing unit illustrated in FIG. 3.

Referring to FIGS. 3 through 6 together with the foregoing FIGS. 2A and 2B, the sensing unit 130 includes a rotating body (or rotating frame) 131, a supporting member (or support frame) 132, a sensing unit (or sensing assembly) 133, and a tilting unit (or tilting module) 134. The rotating body 131 is configured to be horizontally rotatable around a rotation shaft located inside the cleaner body 110. The rotation shaft is formed to be vertically extended inside the cleaner body 110.

The rotating body 131 may form an outer shape of the sensing unit 130 to have a disc shape. Arc-shaped holes 131a1, 131b1 are formed around the center of rotation inside the rotating body 131 and a communication hole 131b2 is formed in the center of rotation of the rotating body 131.

The rotating body 131 is mounted on the upper cover 113 to be horizontally rotatable. As illustrated in the drawings, the rotation shaft is coupled to the upper cover 113 through the communication hole 131b2 so that the rotating body 131 is mounted on the upper cover 113 to be horizontally rotatable.

The supporting member 132 is configured to support the rotating body 131. Specifically, the supporting member 132 is disposed to cover a lower portion of the rotating body 131, and configured to be coupled to the upper cover 113 to rotatably support the rotating body 131.

A fastening boss 132a may protrude from the bottom surface of the support member 132 in a direction toward the upper cover 113. The fastening boss 132a may be coupled to the upper cover 113 through the rotating body 131.

As illustrated in the drawings, as the fastening boss 132a is inserted into the through holes 131a1, 131b1, the horizontally rotating movement of the rotator 131 may be guided by the fastening boss 132a. Furthermore, as the fastening boss 132a is coupled to the upper cover 113, the rotating body 131 may be supported by the supporting member 132.

On the other hand, the fastening boss 132a may of course be formed to be coupled to the upper cover 113 without passing through the rotating body 131, but may preferably be formed to be coupled to the upper cover 113 in view of the external design of the robot cleaner 100.

In addition, a coupling portion (or coupling protrusion) 132b may be protruded from a bottom surface of the supporting member 132 at a position spaced apart from the coupling boss 132a. The coupling portion 132b is coupled to the upper cover 113, and configured to stably support the rotating body 131 together with the coupling boss 132a. In the drawings, it is shown that the coupling portion 132b is disposed to cover an outer circumferential surface on a rear side of the rotating body 131, and coupled to the upper cover 113.

The sensing unit 133 is mounted on the rotating body 131 to sense features in the vicinity of the cleaner body 110. Furthermore, it is configured to vertically tilt the sensing unit 133 based on the tilting axis while looking at the front of the cleaner body. Here, the tilting axis is horizontally extended inside the rotating body 131.

Accordingly, the sensing unit 133 may be rotated to the left or right together with the rotating body 131 to sense a feature on the side of the cleaner body 110, and sense the front upper and lower portions of the cleaner body 110 while being vertically tilted by the tilting unit 134, which will be described later. The tilting unit 134 is configured to vertically tilt the sensing unit 133 based on a tilting axis extended to the left and right of the cleaner body 110.

The tilting unit 134 is mounted on the rotating body 131, and the driving shaft of the tilting unit is horizontally disposed inside the rotating body 131, and connected to the sensing unit 133 to transmit vertical rotation to the sensing unit 133. The sensing unit 133 that has received the vertical movement is configured to be vertically tilted with respect to the tilting axis.

In the drawings, it is shown that the tilting unit 134 and the sensing unit 133 are connected to be rotatable with respect to each other so as to vertically tilt the sensing unit 133. Specifically, the sensing unit 133 is tilted from top to bottom when a tilt arm 134b connected to the tilting unit 134 is rotated from bottom to top, and the sensing unit 133 is tilted from bottom to top when the tilt arm 134b is rotated from top to bottom. According to the above configuration, the sensing unit 133 may vertically tilt based on the tilting axis to sense features located in the front upper and lower parts of the cleaner body 110.

Hereinafter, the detailed structure of the rotating body 131, the supporting member 132, the sensing unit 133, and the tilting unit 134, which are components of the sensing unit 130, will be described in more detail. Referring to FIGS. 4 and 5, the rotating body 131 includes a base frame 131a and a cover frame 131b.

The base frame 131a is configured to form a lower structure of the rotating body 131 and to be supported by the supporting member 132. The base frame 131a is formed with a first hole 131a1, which is an arc-shaped through hole centered on the center of rotation of the rotating body 131.

In addition, a mounting space is formed in the base frame 131a so that various components can be accommodated and mounted. For example, the mounting space is provided with a first mounting portion (or first mounting space) 131a2 on which a pan servo motor 135 which will be described later is mounted, a second mounting portion (or second mounting space) 131a3 on which the sensing unit 133 is mounted, and a third mounting portion 131a4 (or third mounting space) on which the tilting unit 134 is mounted.

The cover frame 131b may be mounted to cover an upper portion of the base frame 131a so as to form an upper structure of the rotating body 131. Here, various mounting methods such as a protrusion-groove coupling structure, a bolt-nut fastening structure, and the like may be considered for a method of mounting the cover frame 131b on the base frame 131a.

The cover frame 131b is provided with a second hole 131b1 corresponding to the first hole 131a1 of the base frame 131a and a communication hole 131b corresponding to the position of the pan servo motor 135 mounted on the first mounting portion 131a2.

The pan servo motor 135 is mounted on the first mounting portion 131a2 and mounted on the upper cover 113 to rotate the rotating body 131. The pan servo motor 135 may be referred to as a first drive unit. As illustrated in the drawings, the pan servo motor 135 is mounted on the first mounting portion 131a2 to form the center of rotation of the base frame 131a, and coupled to the cover 113 through the communication hole 131b2 formed in the cover frame 131b to rotate the rotating body 131.

According to the above configuration, the pan servo motor 135 is driven to rotate the rotating body 131 in the left or right direction desired to rotate. Then, as the sensing unit 133 installed on the rotating body 131 senses a feature on a side surface of the cleaner body while being rotated by the rotating body 131, a sensing region of the sensing unit 133 is increased. Accordingly, the feature sensing and obstacle avoidance performance of the robot cleaner 100 may be improved. In addition, the pan servo motor 135 is configured to be controllable by a preset angle unit (for example, 1 degree), thereby stably rotating the rotating body 131 in the left and right direction even when an impact occurs in the cleaner body 110.

Meanwhile, as described above, the dust bin 140 may be detachably coupled to the cleaner body 110. For this purpose, a coupling protrusion 132d may be protruded on a lower surface of the support member 132 to detachably couple the supporting member 132 to the dust bin 140. In a corresponding manner, a coupling groove 141 is formed on an upper surface of the dust bin 140 (FIG. 2B).

Referring to FIG. 2B, when the coupling protrusion 132d is released from the coupling groove 141 of the dust bin, a coupling between the dust bin 140 and the sensing unit 130 is released, and the dust bin 140 is placed in a state that can be separated from the dust bin accommodation portion 112. On the contrary, when the coupling protrusion 132d engages with the coupling groove 141 of the dust bin 140, the dust bin 140 is coupled to the sensing unit 130, and placed in a state that cannot be separated from the dust bin accommodation portion 112.

Referring to FIGS. 4 and 5, the sensing unit 133 includes a sensor 133a, a sensor cover portion (or sensor housing) 133b, a sensor window portion (or sensor window) 133b2, and a sensor mounting frame 133c. The sensor 133a is disposed on one side of the sensing unit 133 to sense surrounding features and obstacles in front of the cleaner body 110.

The sensor 133a is configured to acquire the three-dimensional shape and color information of an object. For example, an RGB-depth sensor may be used for the sensor 133a. Here, the RGB-depth sensor is a device of acquiring not only the image information of the object but also the depth information of the object based on distance information from the object to the RGB-depth sensor.

The sensor cover portion 133b is configured to protect the sensor 133a from an external environment (e.g., dust, impact, etc.). Specifically, the sensor cover portion 133b may be disposed to cover the sensor 133a and coupled to the sensor mounting frame 133c. In this case, a window hole 133b1 is provided in the sensor cover portion 133b at a position corresponding to the sensor so that light can be incident on the sensor 133a. In the drawings, it is shown that the sensor cover portion 133b is provided with a plurality of window holes 133b1 and coupled to the sensor mounting frame 133c on which the sensor 133a is mounted.

The sensor window portion 133b2 is mounted on the window hole 133b1 so as to cover the sensor 133a. Accordingly, the sensor window portion 133b2 may protect the sensor 133a from an external environment (e.g., dust, dirt, etc.). Furthermore, the sensor window portion 133b2 is made of a transparent material to allow the sensor 133a to clearly sense an object. Here, the term transparency has a concept of translucency as a property of transmitting at least a part of incident light.

The sensor window portion 133b2 may be formed of a synthetic resin material or a glass material. When the sensor window portion 133b2 has translucency, the material itself may be formed to have translucency or a film attached to the material may be formed to have translucency while the material itself has transparency.

Figure 7:
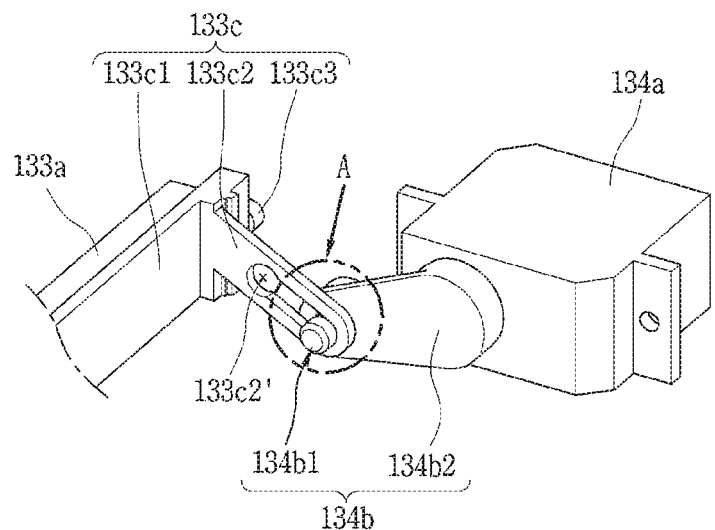
FIG. 7 is a view illustrating a connection structure between the sensor unit and the tilt unit in FIG. 4.
Figure 8:
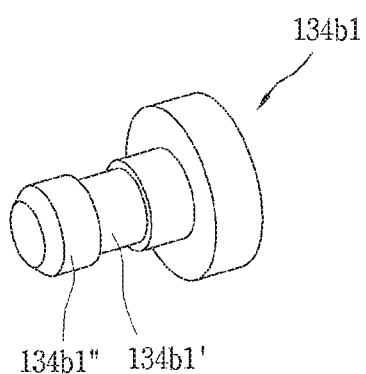
FIG. 8 is a view illustrating an embodiment of a fastening portion disclosed in FIG. 7.
Figure 9:
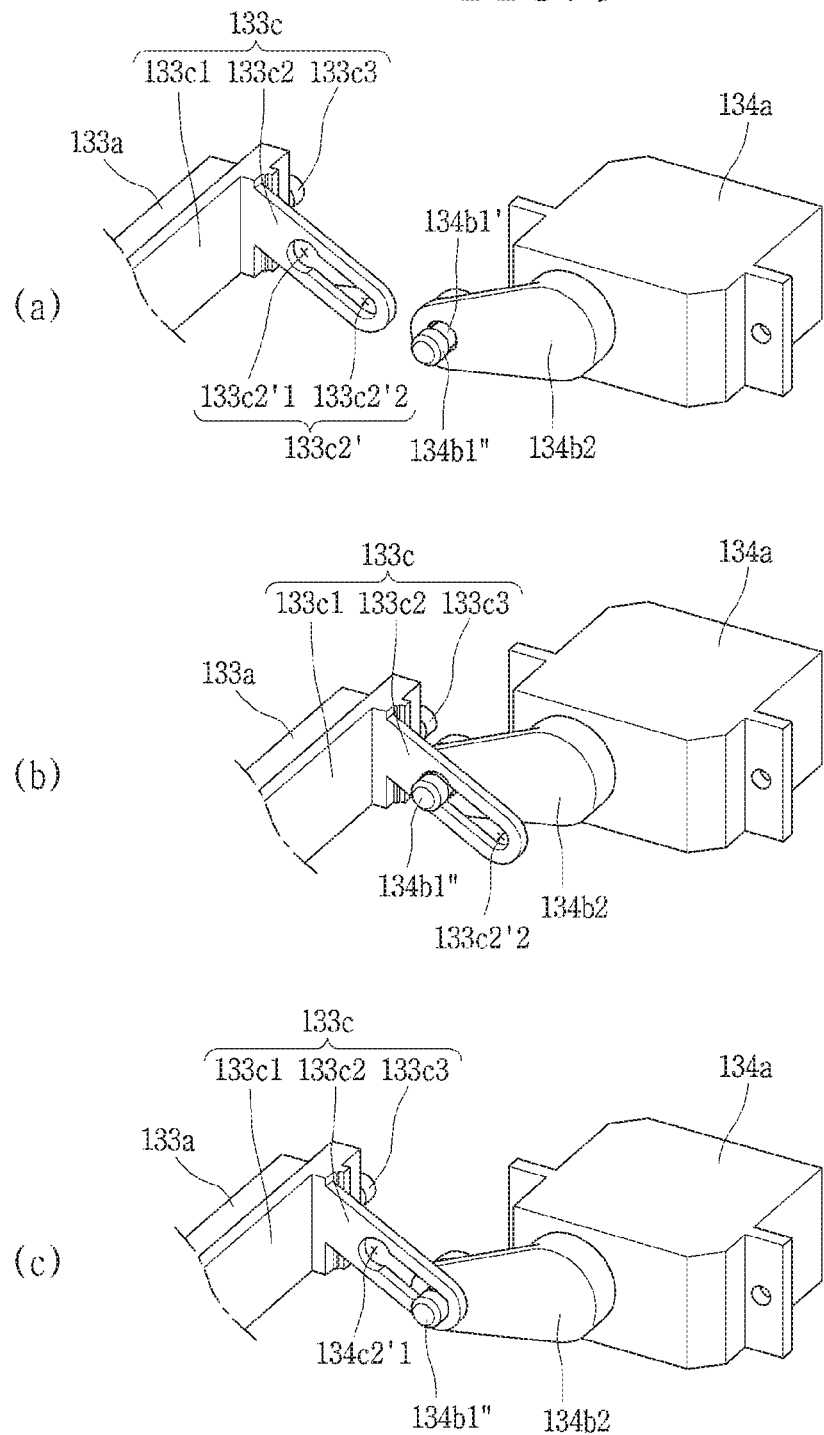
FIG. 9 is a view illustrating an assembling sequence between the sensor unit and the tilt unit illustrated in FIG. 7; and 10A and 10B are views illustrating an operating state of the sensing unit illustrated in FIG. 3.

The sensor mounting frame 133c is configured to connect the sensing unit 133 to the tilting unit 134 and the rotating body 131, respectively. FIGS. 7 through 9 are views showing a connection relationship between the sensing unit 133 and the tilting unit 134 illustrated in FIGS. 4 and 5.

Referring to the drawings, it is seen that a sensor mounting portion (or sensor mounting surface) 133c1 on which the sensor 133a is mounted is provided on one surface of the sensor mounting frame 133c, and the sensor cover portion 133b is coupled to the sensor mounting portion 133c1. A mounting hole 133c2' is formed in an extension portion (or extension) 133c2 extended from the sensor mounting portion 133c1 in a direction opposite to the sensor 133a so as to be rotatably connected to the tilting unit 134.

Referring to FIG. 9, the mounting hole 133c2' includes a first through portion (or first through opening) 133c2'1 through which the fastening portion (or fastening extension) 134b1 of the tilt arm 134b is inserted and a second through portion (or second through opening) 133c2'2 extended from the first through portion 133c2'1 and configured such that the fastening portion 134b1 of the tilt arm 134b is engaged with one end thereof to be rotatable.

The mounting hole 133c2' includes the first through portion 133c2'1 and the second through portion 133c2'2, and the second through portion 133c2'2 is extended from the first through portion 133c2'1. A diameter of the first through portion 133c2'1 is formed to be larger than a width of the second through portion 133c2'2, and formed to be larger than a diameter of a second portion (or shaft end) 134b1" of the fastening portion 134b1 while will be described later to insert the fastening portion 134b1 of the tilt arm 134b of the tilting unit 134 thereinto.

A rotation protrusion 133c3 is formed on the sensor mounting frame 133c so as to be mounted on the rotating body 131. Here, a line extending from the rotation protrusion 133c3 serves as a tilting axis of the sensing unit 133.

In the drawings, it is shown that a rotation groove 131a3' is formed on the second mounting portion 131a3 of the rotating body 131, and the rotation protrusion 133c3 is inserted into the rotation groove 131a3' such that the sensor mounting frame 133c is vertically tilted by the tilting unit 134. According to the above configuration, the sensing unit 133 may be vertically tilted to sense an obstacle located in a low or high region. Accordingly, the feature sensing and obstacle avoidance performance of the robot cleaner 100 may be improved.

Referring to FIGS. 4, 5 and 7 through 9, the tilting unit 134 includes a tilt servo motor 134a and a tilt arm 134b. The tilt servo motor 134a is mounted on the second mounting portion 131a3 and causes the tilt arm 134b connected to the drive shaft 134a1 of the tilt servo motor 134a to perform an oscillatory movement. The tilt servo motor 134a may be referred to as a second drive unit.

As illustrated in the drawings, the tilt servo motor 134a is disposed on the same plane as the pan servo motor 135 installed inside the base frame 131a, and the drive shaft 134a of the tilt servo motor 134a is mounted to intersect with the drive shaft 135a of the pan servo motor 134a. According to the above configuration, the tilt servo motor 134a is configured to be controllable by a preset angle unit (for example, 1 degree), thereby stably tilting the rotating body 133 in a top-down direction even when an impact occurs in the cleaner body 110.

In addition, the tilt servo motor 135 may be disposed on the same plane of the base frame 131a on which the pan servo motor 135 is mounted, thereby reducing a thickness of the sensing unit to be smaller than that of the pan-tilt apparatus 20, 30 in the related art. One side of the tilt arm 134b is connected to the tilt servo motor 134a and the other side is connected to the sensor mounting frame 133c to transmit a rotational movement of the tilt servo motor 134a to the sensing unit 133.

Specifically, the tilt arm 134b includes a link portion (or link) 134b2 connected to the drive shaft of the tilt servo motor 134a, and a fastening portion (or fastening protrusion) 134b1 protruded from the other side of the link portion 134b2, and inserted into the mounting hole 133c2' of the sensor mounting frame 133c to be rotatable. Referring to FIGS. 7 and 8, the fastening portion 134b1 is fabricated in a pin shape and inserted into the mounting hole 133c2'.

The fastening portion 134b1 includes a first portion (or shaft) 134b1' and a second portion (or shaft end) 134b1". The first portion 134b1' is disposed in the second through portion 133c2'2 of the mounting hole 133c2' formed on the sensor mounting frame 133c. A diameter of the second portion 134b1" is formed to be larger than that of the second through portion 133c2'2, and the second portion 134b1" may be disposed to cover the extension portion 133c2 of the sensor mounting frame 133c while the first portion 134b1' is inserted into the second through portion 133c2'2. The fastening portion 134b1 may be fabricated in a pin shape to be connected to the sensor mounting frame 133c, and also integrally fabricated with the tilt arm 134b to be connected to the sensor mounting frame 133c.

FIG. 9 shows a process of assembling the tilting unit 134 to the sensing unit 133. The specific assembly process includes a first step (sections A and B of FIG. 9) of inserting the fastening portion 134b1 into the first through portion 133c2'1, a second step (sections B and C of FIG. 9) of moving the fastening portion 134b1 along a path extended from the first through hole 133c2'1 to the second through hole 133c2'2, and a third step (section C of FIG. 9) of allowing the fastening portion 134b1 to engage with one end of the second through portion 133c2'2.

According to the above configuration, it may be possible to prevent the fastening portion 134b1 from being released from the mounting hole 133c2 of the sensor mounting frame 133c. Furthermore, the sensing unit 133 may be vertically tilted with respect to the tilting axis by the tilting unit 134 to secure an angle of view of the sensor with respect to the front upper and lower portions of the robot cleaner 100, thereby improving the feature sensing and obstacle avoidance performance of the robot cleaner 100.

Moreover, the tilting arm 134b is inserted and fastened to the mounting hole 133c2' of the sensor mounting frame of the sensing unit 133 to improve the assembly and disassembly convenience of the sensing unit 130, thereby having an advantage of being easily repaired in case of a failure of the sensing unit 130.

Figure 10A:
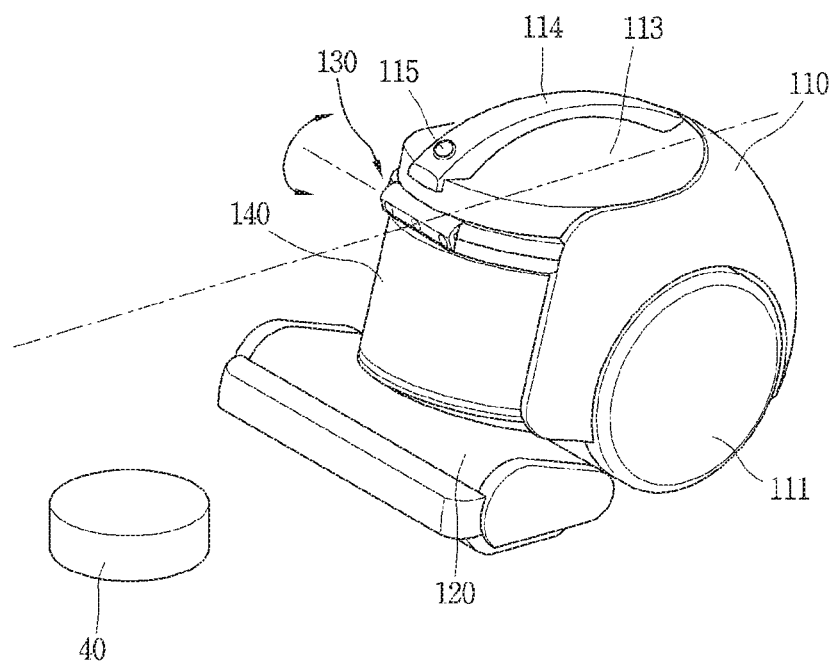
Figure 10B:
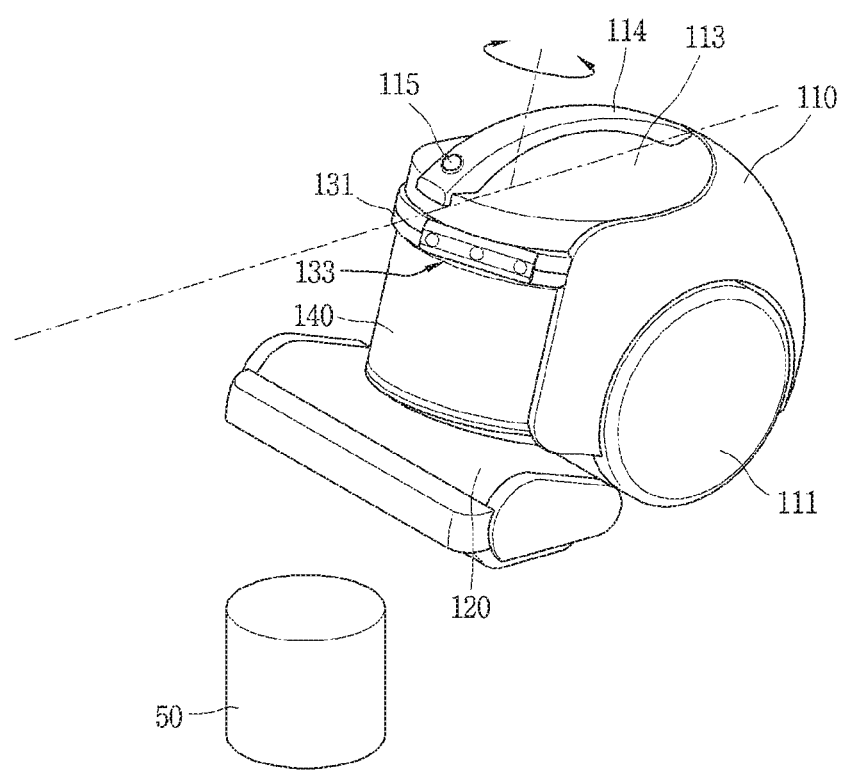

On the other hand, FIGS. 10A and 10B are views showing an operating state of the robot cleaner 100 in which the sensing unit 130 illustrated in FIG. 2A is configured to be capable of panning and tilting. A controller (not shown) is configured to control the pan servo motor 135 to horizontally rotate the rotating body 131 or control the tilt servo motor 134a to vertically tilt the sensing unit 133.

Referring to FIGS. 10A and 10B, for an example, when it is necessary to check a first obstacle 40 located at the front upper or lower portion of the robot cleaner, the controller tilts the sensing unit 133 in the direction of the first obstacle 40 to drive the tilt servo motor 134a so as to allow the sensor 133a to sense the first obstacle 40. For another example, when it is necessary to check a second obstacle 50 located in a direction desired by the robot cleaner 100 to rotate, the controller rotates the rotating body 131 in a direction desired to rotate to drive the pan servo motor 135 so as to allow the sensor 133a to sense the second obstacle 50. The controller may of course drive the pan servo motor 135 and the tilt servo motor 134a at the same time when necessary.

According to the above configuration, the feature and obstacle sensing and obstacle avoidance performance of the robot cleaner 100 may be improved.

As described above, the robot cleaner 100 of the present disclosure may be configured with the sensing unit 130 capable of panning and tilting to sense a wider area than the robot cleaner in which the sensing unit is fixed. Accordingly, the surrounding feature sensing and obstacle avoidance performance of the robot cleaner 110 may be improved. Moreover, the rotating body 131, the supporting member 132, the sensing unit 133 and the tilting unit 134 may be integrally designed into the sensing unit 130, thereby reducing an overall size of the robot cleaner 100.

A first aspect of the present disclosure is to provide a sensing unit capable of ensuring a sensing region of a sensor to be wider than an existing robot cleaner so as to improve the feature sensing and obstacle avoidance performance of a robot cleaner. A second aspect of the present disclosure is to provide the sensing unit having a compact structure suitable for a robot cleaner.

A third aspect of the present disclosure is to provide a stable arrangement structure between a cleaner body, a dust bin and the sensing unit. A fourth aspect of the present disclosure is to provide the sensing unit having an internal structure designed to facilitate assembly and disassembly. A fifth aspect of the present disclosure is to provide a method of controlling the operation of the sensing unit.

In order to accomplish the first aspect of the present disclosure, a robot cleaner may include a cleaner body; and a sensing unit disposed in the cleaner body, wherein the sensing unit includes a rotating body configured to be horizontally rotatable around a rotation shaft passing through an inside of the cleaner body; a sensing unit mounted on one side of the rotating body to sense a feature or an obstacle in the vicinity of the cleaner body; and a tilting unit installed inside the rotating body to vertically tilt the sensing unit.

A dust bin accommodation portion to which a dust bin is detachably coupled may be formed in the cleaner body, and the sensing unit may be disposed at an upper portion of the dust bin. An upper cover disposed to cover an upper surface of the dust bin accommodated in the dust bin accommodation portion may be hinge-connected to the cleaner body, and the rotating body may be rotatably mounted on the upper cover. The rotating body may include a base frame to which a pan servo motor that horizontally rotates the rotating body, the sensing unit, and the tilting unit are mounted, and a cover frame mounted to cover an upper portion of the base frame.

The sensing unit may include a sensor mounting frame connected to the tilting unit and configured to be rotatable about a tilting axis intersecting the rotation shaft when the tilting unit is driven; and a sensor mounted on the sensor mounting frame. A rotation groove into which a rotation protrusion protruded from both ends of the sensor mounting frame is rotatably inserted may be formed on the rotating body, and the rotation protrusion may form a tilting axis of the sensing unit.

The tilting unit may include a tilt servo motor disposed inside the rotating body to perform an oscillatory movement; and a tilt arm connected to the rotation shaft and the sensor mounting frame of the tilt servo motor, respectively, to rotate the sensor mounting frame about the tilting axis during the rotation of the tilt server motor. The tilting unit may include a tilt servo motor disposed inside the rotating body to perform an oscillatory movement; and a tilt arm connected to the rotation shaft and the sensor mounting frame of the tilt servo motor, respectively, to rotate the sensor mounting frame about the tilting axis during the rotation of the tilt server motor.

The cleaner body may include a cleaning module disposed in a shape protruded from the cleaner body and configured to suck dust or mop the floor; and a sensing unit accommodated in the cleaner body and disposed on a front side of the cleaner body in which the cleaning module is located.

In order to accomplish the second aspect of the present disclosure, an arc-shaped first through hole centered on the rotation shaft may be formed in the base frame, and a second through hole corresponding to the first through hole and a communication hole for mounting the pan servo motor on the upper cover may be formed on the cover frame, and the pan servo motor may be rotatably coupled to the upper cover through the communication hole.

The sensing unit may include a sensor mounting frame connected to the tilting unit and configured to be rotatable about a tilting axis intersecting the rotation shaft when the tilting unit is driven; and a sensor mounted on the sensor mounting frame. A rotation groove into which a rotation protrusion protruded from both ends of the sensor mounting frame is rotatably inserted may be formed on the rotating body, and the rotation protrusion may form a tilting axis of the sensing unit.

In order to accomplish the third aspect of the present disclosure, the sensing unit may further include a supporting member coupled to the upper cover to support a lower portion of the rotating body. An arc-shaped through hole centered on the rotation shaft may be formed in the rotating body, and a fastening boss coupled to the upper cover through the through hole may be protruded on the supporting member.

A coupling protrusion may be protruded from a lower surface of the supporting member, and a coupling groove may be formed on an upper surface portion of the dust bin to be engaged with the coupling protrusion, and the supporting member may be detachably coupled to the dust bin by the coupling protrusion and the coupling groove.

In order to accomplish the fourth aspect of the present disclosure, the mounting hole may include a first through portion into which the fastening portion is inserted; and a second through portion extended from the first through portion, and configured such that the fastening portion is engaged with one end thereof to be rotatable, and the fastening portion may include a first portion disposed within the second through portion; and a second portion formed to have a larger diameter than the first through portion and disposed to cover the sensor mounting frame while the first portion is inserted into the second through portion, In order to accomplish the fifth aspect of the present disclosure, there is provided a robot cleaner, including a cleaner body provided with a wheel unit and a controller that controls the driving of the wheel unit; and a sensing unit disposed in the cleaner body, wherein the sensing unit includes a rotating body configured to be horizontally rotatable around a rotation shaft passing through an inside of the cleaner body; a drive unit mounted on the rotating body and configured to horizontally rotate the rotating body; a sensing unit mounted on one side of the rotating body to sense a feature or an obstacle in the vicinity of the cleaner body; and a tilting unit installed inside the rotating body to vertically tilt the sensing unit, and the controller may control the driving of the drive unit and the tilting unit.

According to an embodiment, a robot cleaner of the present disclosure may include a cleaner body formed with a dust bin accommodation portion to which a dust bin is detachably coupled, and provided with an upper cover disposed to cover an upper portion of the dust bin; and a sensing unit disposed between an upper portion of the dust bin and the upper cover, wherein the sensing unit includes a rotating body configured to be horizontally rotatable around a rotation shaft formed inside the cleaner body; a sensing unit mounted on one side of the rotating body to sense a feature or an obstacle in the vicinity of the cleaner body; a tilting unit installed inside the rotating body to vertically tilt the sensing unit; and a supporting member configured to support a lower portion of the rotating body.

An arc-shaped through hole centered on the rotation shaft may be formed in the rotating body, and a fastening boss coupled to the upper cover through the through hole may be protruded on the supporting member. The rotating body may include a base frame in which a pan servo motor that horizontally rotates the rotating body, the sensing unit, and the tilting unit are disposed on the same plane, and a cover frame mounted to cover an upper portion of the base frame.

The sensing unit may include a sensor mounting frame connected to the tilting unit and configured to be rotatable about a tilting axis intersecting the rotation shaft when the tilting unit is driven; and a sensor mounted on the sensor mounting frame, and a rotation groove into which a rotation protrusion protruded from both ends of the sensor mounting frame is rotatably inserted may be formed on the rotating body, and the rotation protrusion may form a tilting axis of the sensing unit.

The tilting unit may include a tilt servo motor disposed inside the rotating body to perform an oscillatory movement; and a tilt arm connected to the rotation shaft and the sensor mounting frame of the tilt servo motor, respectively, to rotate the sensor mounting frame about the tilting axis during the rotation of the tilt server motor, and wherein the tilt arm may include a link portion having one end portion connected to the rotation shaft of the tilt servo motor; and a fastening portion protruded from the other end portion of the link portion, and inserted into a mounting hole of the sensor mounting frame to be rotatable.

The effects of the present disclosure obtained through the foregoing solutions are as follows. First, according to aspects of the present disclosure, the sensing unit may be mounted on the rotating body and rotated right and left during the rotation of the rotating body, and configured to be vertically tilted by the tilting unit, thereby extending a sensing region of the sensing unit. Therefore, the feature sensing and obstacle avoidance performance of the robot cleaner can be improved.

Furthermore, the sensing unit may include a pan servo motor and a tilt servo motor that can be controlled by a preset angle unit (for example, 1 degree), thereby stably sensing the surrounding features of the robot cleaner even when an impact occurs in the cleaner body. In addition, the sensing unit with the foregoing structure may be mounted on the bottom of the upper cover to cover the dust bin, thereby providing a robot cleaner having a new form factor.

Second, according to the present disclosure, the pan servo motor may be disposed on the same plane as the tilt servo motor, thereby having an advantage capable of reducing the thickness of the sensing unit compared to the Korean Patent No. 10-1222929, which is an aforementioned background art. Accordingly, it may be possible to minimize a height increase of the robot cleaner due to the provision of the sensing unit.

Third, according to the present disclosure, the support member may be coupled to an upper cover of the cleaner body through a through hole formed in the rotating body, thereby securing a stable coupling state of the sensing unit. Fourth, according to the present disclosure, a fastening portion of the tilt arm may be inserted into one end of a mounting hole of the sensor mounting frame, and then slid in one direction and fixed to the other end of the mounting hole, thereby improving the ease of assembly of the above components.

Fifth, according to the present disclosure, the controller of the robot cleaner may be configured to vertically tilt the sensing unit to check an obstacle during travel, and horizontally rotate (pan) the rotating body in an avoiding direction in order to avoid an obstacle, thereby improving the performance of sensing the features and obstacles of the robot cleaner.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autonomous cleaner, comprising:
a cleaner body;
an upper cover hinge-connected to the cleaner body; and
a sensing module provided in the cleaner body,
wherein the sensing module includes:
a rotating body that is horizontally rotatable around a rotation shaft within the cleaner body;

a sensor mounted on the rotating body, the sensor detecting a feature or an obstacle outside of the cleaner body;
a tilt servo motor provided in the rotating body, the tilt servo motor providing a force to adjust a vertical tilt of the sensor; and
a supporting frame that rotatably receives the rotating body, wherein
an arc-shaped through hole centered on the rotation shaft is formed in the rotating body, and
a fastening boss coupled to the upper cover through the arc-shaped through hole protrudes from the supporting frame.

2. The autonomous cleaner of claim 1, wherein:
a dust bin accommodation recess, to which a dust bin is detachably coupled, is formed in the cleaner body, and
the sensing module is provided at an upper opening of the dust bin.

3. The autonomous cleaner of claim 2, wherein:
the upper cover is provided over the upper opening of the dust bin accommodated in the dust bin accommodation recess, and
the rotating body is rotatably mounted to the upper cover.

4. The autonomous cleaner of claim 2, wherein:
a coupling protrusion extends from a lower surface of the supporting frame,
a coupling groove is formed on an upper surface of the dust bin to engage the coupling protrusion, and
the supporting frame is detachably coupled to the dust bin by the coupling protrusion and the coupling groove.

5. The autonomous cleaner of claim 1, wherein the rotating body includes:
a base frame to which a pan servo motor that provides a force to horizontally rotate the rotating body, the sensor, and the tilt servo motor are mounted, and
a cover frame mounted to cover an upper opening of the base frame.

6. The autonomous cleaner of claim 5, wherein the arc-shaped through hole is formed in the base frame, and
another through hole corresponding to the arc-shaped through hole and a communication hole to mount the pan servo motor on the upper cover are formed on the cover frame, and
the pan servo motor is rotatably coupled to the upper cover through the communication hole.

7. The autonomous cleaner of claim 1, wherein the sensing module further includes a sensor mounting frame connected to the tilt servo motor and configured to be rotatable about a tilting axis intersecting the rotation shaft when the tilt servo motor is driven, and
wherein the sensor is mounted on the sensor mounting frame.

8. The autonomous cleaner of claim 7, wherein:
a rotation groove, into which a rotation protrusion extending from surfaces of the sensor mounting frame is rotatably inserted, is formed on the rotating body, and
the rotation protrusion forms a tilting axis of the sensing module.

9. The autonomous cleaner of claim 8, wherein the tilt servo motor is provided inside the rotating body to perform an oscillatory movement; and
wherein the sensor module further includes a tilt arm connected to a drive shaft of the tilt servo motor and the sensor mounting frame, respectively, to rotate the sensor mounting frame about the tilting axis during the oscillatory movement of the tilt server motor.

10. The autonomous cleaner of claim 9, wherein the tilt arm includes:
a link having a first end connected to the drive shaft of the tilt servo motor; and
a fastening protrusion extending from a second end of the link, the fastening protrusion being inserted into a mounting hole of the sensor mounting frame to be rotatable.

11. The autonomous cleaner of claim 10, wherein the mounting hole includes:
a first through opening into which the fastening protrusion is inserted; and
a second through opening extended from the first through opening, and configured such that the fastening protrusion is engaged with one end thereof to be rotatable, and
the fastening protrusion includes:
a shaft provided within the second through opening; and
a shaft end formed to have a larger diameter than the first through opening and provided to cover the sensor mounting frame while the shaft is inserted into the second through opening.

12. The autonomous cleaner of claim 1, wherein the cleaner body includes:
a cleaning head protruded from a front of the cleaner body and configured to suction dust or mop a floor; and
a camera provided on the front of the cleaner body.

13. An autonomous cleaner, comprising:
a cleaner body having a dust bin accommodation recess to which a dust bin is detachably coupled,
a cover that is positioned on an upper opening of the dust bin; and
a sensing module disposed between the upper opening of the dust bin and the cover,
wherein the sensing module includes:
a rotating body that is horizontally rotatable around a rotation shaft formed inside the cleaner body;
a sensor provided in the rotating body to detect a feature or an obstacle outside of the cleaner body;
a tilt servo motor installed inside the rotating body and providing a force to adjust a vertical tilt of the sensor; and
a supporting frame that rotatably receives the rotating body wherein
an arc-shaped through hole centered on the rotation shaft is formed in the rotating body, and
a fastening boss coupled to the cover through the arc-shaped through hole protrudes from the supporting frame.

14. The autonomous cleaner of claim 13, wherein the rotating body includes:
a base frame in which a pan servo motor that horizontally rotates the rotating body, the sensor, and the tilt servo motor are provided on a common plane, and
a cover frame mounted to cover an upper opening of the base frame.

15. The autonomous cleaner of claim 14, wherein the sensing module further includes:
a sensor mounting frame connected to the tilt servo motor and configured to be rotatable about a tilting axis intersecting the rotation shaft when the tilt servo motor is driven, wherein:
the sensor is mounted on the sensor mounting frame,
a rotation groove, into which a rotation protrusion protruded from both ends of the sensor mounting frame is rotatably inserted, is formed on the rotating body, and
the rotation protrusion forms a tilting axis of the sensor.

16. The autonomous cleaner of claim 15,
wherein the tilt servo motor is provided inside the rotating body to perform an oscillatory movement; and
wherein the sensing module further includes:
- a tilt arm connected to a drive shaft of the tilt servo motor and the sensor mounting frame to rotate the sensor mounting frame about the tilting axis based on the oscillatory movement of the tilt server motor, and wherein the tilt arm includes:
- a link having a first end connected to the rotation shaft of the tilt servo motor; and
- a fastening protrusion at a second end of the link, the fastening protrusion being inserted into a mounting hole of the sensor mounting frame to be rotatable.

17. An autonomous cleaner, comprising:
a cleaner body;
a wheel that is driven to move the cleaner body;
an upper cover connected to the cleaner body by a hinge; and
a sensing module provided in the cleaner body, wherein the sensing module includes:
- a rotating body that is horizontally rotatable around a rotation shaft in the cleaner body;
- a pan servo motor mounted in the rotating body and configured to provide a force to horizontally rotate the rotating body;
- a sensor mounted on the rotating body to sense a feature or an obstacle outside of the cleaner body;
- a tilt servo motor mounted in the rotating body and configured to provide a force to vertically tilt the sensor; and
- a supporting frame that rotatably receives the rotating body, wherein
  - an arc-shaped through hole centered on the rotation shaft is formed in the rotating body, and
  - a fastening boss coupled to the cover through the arc-shaped through hole protrudes from the supporting frame.

\* \* \* \* \*